US012617663B2

(12) United States Patent
Morris et al.

(10) Patent No.: US 12,617,663 B2
(45) Date of Patent: May 5, 2026

(54) COMPACT WATER BOTTLE FILLING STATION AND RETROFITTING METHOD

(71) Applicant: Acorn Engineering Company, City Of Industry, CA (US)

(72) Inventors: Donald E. Morris, Newport Coast, CA (US); Darryl M. Boeltl, Whittier, CA (US)

(73) Assignee: Acorn Engineering Company, City of Industry, CA (US)

( * ) Notice: Subject to any disclaimer, the term of this patent is extended or adjusted under 35 U.S.C. 154(b) by 869 days.

(21) Appl. No.: 17/402,168

(22) Filed: Aug. 13, 2021

(65) Prior Publication Data

US 2022/0048751 A1 Feb. 17, 2022

Related U.S. Application Data

(60) Provisional application No. 63/065,169, filed on Aug. 13, 2020.

(51) Int. Cl.
*B67D 1/00* (2006.01)
*E03B 9/20* (2006.01)

(52) U.S. Cl.
CPC .............. *B67D 1/0014* (2013.01); *E03B 9/20* (2013.01); *B67D 2210/00039* (2013.01)

(58) Field of Classification Search
CPC ................ B67D 1/0014; B67D 1/0888; B67D 2210/00039; B67D 2210/00034; B67D 1/06; B67D 1/08; B67D 1/0858; E03B 9/20; F25D 19/00; F25D 31/002; F25D 19/02; F25D 2317/068
See application file for complete search history.

(56) References Cited

U.S. PATENT DOCUMENTS

| | | | | | |
|---|---|---|---|---|---|
| 5,881,913 | A * | 3/1999 | Boulter | B01D 61/12 222/2 |
| 10,926,993 | B2 * | 2/2021 | Lynch | B67D 3/0077 |
| 10,934,694 | B1 * | 3/2021 | Porter | E03C 1/326 |
| 11,479,454 | B1 * | 10/2022 | Wink | B67D 1/0014 |
| 2009/0242075 | A1 * | 10/2009 | Busick | B67D 3/0077 141/85 |
| 2012/0104031 | A1 * | 5/2012 | McDonald | B67D 1/0888 222/1 |
| 2013/0332239 | A1 * | 12/2013 | Matre | G06Q 30/0241 700/232 |
| 2014/0311620 | A1 * | 10/2014 | Hancock | B67D 1/0014 141/2 |

(Continued)

*Primary Examiner* — Jeremy Carroll
(74) *Attorney, Agent, or Firm* — Honigman LLP; Eric J. Sosenko; Jonathan P. O'Brien

(57) ABSTRACT

A compact water bottle filling station for mounting to a wall. The station includes a frame supported on the wall by a wall hanger bracket and a basin supported by the frame. The basin includes a receiptacle located between a front lip and a rear edge of the basin, which define a lateral distance therebetween. A cover surrounds the frame on at least three sides and includes a pair of opposed side panels and a front panel located there between. The front panel extends upwardly from the base of the compact bottle filling station and terminates at and underneath the basin. A backsplash extends upward from the basin, adjacent the rear edge, and has a nozzle provided therein to direct water toward the basin.

16 Claims, 6 Drawing Sheets

(56) References Cited

U.S. PATENT DOCUMENTS

| | | | | |
|---|---|---|---|---|
| 2014/0379148 | A1* | 12/2014 | Sawyer | G06Q 20/145<br>705/14.69 |
| 2018/0306492 | A1* | 10/2018 | Nanos | F25D 31/002 |
| 2022/0048751 | A1* | 2/2022 | Morris | B67D 1/0014 |
| 2022/0402742 | A1* | 12/2022 | Pittaway | B67D 1/10 |
| 2025/0019220 | A1* | 1/2025 | Wilson | B67D 1/16 |

* cited by examiner

COMPACT WATER BOTTLE FILLING STATION AND RETROFITTING METHOD

BACKGROUND

1. Field of the Invention

The present invention generally relates to equipment for filling personal use water bottles. More specifically, the invention relates to a bottle filling station that is compact in size and which may be retrofitted in place of wall mounted drinking fountain.

2. Description of Related Art

Water coolers, also referred to as drinking fountains, have long been a mainstay of public facilities and institutions, including, without limitation, schools, libraries, shopping malls, department stores, grocery stores, airports, sports venues and parks, to name a few. Recently, however, there has been increased emphasis to reduce the person-to-person transmission of germs, such as disease causing viruses and bacteria. Because of the close personal contact, of a person's mouth and hands, that is required to drink from the stream of water emitted from the bubbler of a drinking fountain, drinking fountains are being used less frequently.

Accompanying the decrease in use of water fountains has been an increase in use of water bottles. This increase in use of water bottles for personal consumption of water in public spaces has further reduced the need for and use of drinking fountains.

However, water bottles are not without their own drawbacks. For example, once the water bottle is empty, if it is a single use bottle, the container is thrown away. If it is a multiuse bottle, being able to refill the container can be challenging and may require use a drinking fountain, which again raises issues relating the cleanliness of the drinking fountain.

In view of the above, some drinking fountains are provided with an integrated water bottle filling unit. Such integrated systems use a higher located nozzle and a hand's free sensor to allow a water bottle to be sanitarily filled. As a result, the refilling of an empty water bottle is easier and cleaner than filling it using the bubbler of a drinking fountain.

Such integrated water bottle filling units, however, can be problematic to access and use. In particular, smaller framed individuals may find it challenging to access the water bottle filling features. These features are located at the back of the drinking fountain and require the user reach over the basin of the drinking fountain to gain access to the bottle filling features The height of the sensor and nozzle also impact accessibility. Additionally, the sanitary aspects of the bubbler remain and the bubbler may be inadvertently contacted during use of the bottle filler features.

Accordingly, being able to provide a public facility with a sanitary and easily accessed means for filling water bottles is increasingly desirable. In response to this need, a more accessible water bottle filling station is needed.

SUMMARY

In satisfying the above need, as well as overcoming various drawbacks and other limitations of the related art, the present invention provides a compact personal water bottle filling station that has enhanced accessibility and can also be used retrofit a wall-mounted drinking water fountain into a wall-mounted water bottle filling station.

In one aspect, the present invention provides a compact water bottle filling station for mounting to a wall. The water bottle filling station includes a frame configured to be supported on the wall by a wall hanger bracket that is secured to the wall. A basin is supported by the frame and has a recessed receptacle with a drain opening, the basin being provided between a front lip and a rear edge, which define a lateral distance therebetween. A cover surrounds at least three sides of the frame and includes a pair of opposed side panels and a front panel located between the side panels. The front panel extends upward from a base of the filling station and terminates underneath and adjacent to the basin. A backsplash extends upward from an area adjacent the rear edge of the basin and includes a nozzle that is configured to direct water downward into the basin.

In another aspect, the invention provides, in combination, a water bottle filling station for retrofitting a wall-mounted drinking fountain into a wall-mounted water bottle filling station and employing a wall hanger bracket of the drinking fountain mounted to the wall. The station includes a frame that is configured to be supported on the wall by the wall hanger bracket of the drinking fountain secured to the wall; a basin supported by the frame and having a recessed receptacle including a drain opening, the basin including an front edge and a rear edge that define a lateral distance therebetween extending perpendicularly to the wall. A cover surrounds at least three sides of the frame, and the cover including a pair of opposed side panels and a front panel located between the side panels. The front panel extends upwardly from a base of the filling station and terminates underneath and adjacent to the basin. Extending upward from adjacent the rear edge of the top is a backsplash having a nozzle configured to direct water downward toward the basin.

In another aspect, the lateral distance is greater than 4 inches and less than 13 inches.

In a further aspect, the lateral distance is in the range of 11 to 12 inches.

In an additional aspect, the lateral distance is at least 6.5 inches less than a corresponding lateral distance of a wall mountable drinking fountain having a bubbler.

In yet another aspect, the front panel terminates underneath the basin at a location between the receptacle and the front edge.

In still a further aspect, the front panel is planar and extends up to the basin at an oblique angle relative to the rear side of the compact water bottle filling.

In an additional aspect, the front panel extends at an angle in the range of 6° to 19°.

In still another aspect, the front panel extends at an angle in the range of 15° to 19°.

In yet a further aspect, the front panel extends at an angle in the range of 16° to 18°.

In an additional aspect, the water bottle filling station includes a chiller, for cooling water, positioned within the frame.

In further additional aspect, a singular water dispensing device is provided on the compact water bottle filling station and the nozzle is the singular water dispensing device.

In a further aspect, the nozzle is coupled to an existing water supply line extending from the wall.

In yet a further aspect, the drain opening is coupled to an existing waste pipe extending from the wall.

In another aspect, the invention provides a method of retrofitting a wall-mounted drinking fountain installation that includes a water supply line extending from a wall of the installation site, a wall hanger bracket mounted to the wall, a drainage system fitting extending from the wall, a drinking water fountain engaged with and supported by the wall hanger bracket, a bubbler configured to dispense water upward and connected to the water supply line, a receptacle defined in a top of the fountain and located adjacent to the bubbler to receive water from the bubbler and direct said water to a drain opening defined in the receptacle, a drain line connecting the drain opening to the drainage system fitting. The method includes the steps of: decoupling the water supply line of the drinking water fountain from the water supply fitting; decoupling the drain line of the drainage system fitting; removing the drinking fountain from engagement with the wall hanger bracket so that the drinking fountain is un-supported by the wall hanger bracket; providing a water bottle filling station including a frame configured to be supported by the wall hanger bracket of the drinking fountain, a basin supported by the frame and having a drain opening coupled to a drain line, a cover surrounding at least three sides of the frame, the cover including a pair of opposed side panels and a front panel located between the side panels, the front panel extending upwardly from a base of the water bottle filling station and terminating at and underneath the basin, a nozzle supported by a backsplash and configured to direct water downward from the nozzle toward the basin, the basin having a front lip spaced a lateral distance from a rear edge of the basin; supporting the water bottle filling station on the wall hanger bracket; coupling the water supply line of the water bottle filling station to the water supply line extending from the wall; and coupling the drain line of the water bottle filling station to the drainage system fitting of the water bottle filling station.

In another aspect, the invention provides a method of retrofitting a wall-mounted drinking fountain installation that includes a water supply line extending from a wall of the installation site, a wall hanger bracket mounted to the wall, a drainage system fitting extending from the wall, a drinking water fountain engaged with and supported by the wall hanger bracket, a bubbler configured to dispense water upward and connected to the water supply line, a receptacle defined in a top of the fountain and located adjacent to the bubbler to receive water from the bubbler and direct said water to a drain opening defined in the receptacle, a drain line connecting the receptacle to the drainage system fitting. The method includes the steps of: decoupling the water supply line of the drinking water fountain from the water supply fitting; decoupling the drain line of the drainage system fitting; removing the drinking fountain from engagement with the wall hanger bracket so that the drinking fountain is un-supported by the wall hanger bracket; removing the wall hanger bracket from the wall; providing a water bottle filling station including a frame configured to be supported by a second wall hanger bracket, a basin having a recessed receptacle defined therein and supported by the frame, a drain opening provided in the receptacle and coupled to a drain line, a cover surrounding at least three sides of the frame, the cover including a pair of opposed side panels and a front panel located between the side panels, the front panel extending upwardly from a base of the water bottle filling station and terminating adjacent to and underneath the basin, a nozzle supported by a backsplash and configured to direct water downward from the nozzle toward the basin, the basin having a front lip located forward of the backsplash, the basin further having a rear edge spaced a lateral distance from the front lip of the basin; securing the second wall hanger bracket to the wall; supporting the water bottle filling station on the second wall hanger bracket; coupling the water supply line of the water bottle filling station to the water supply line extending from the wall; and coupling the drain line of the water bottle filling station to the drainage system fitting of the water bottle filling station.

In a further aspect, the methods includes coupling the nozzle to an existing water supply line extending from the wall.

In yet a further aspect, the methods include coupling the drain opening to an existing waste pipe extending from the wall.

Further objects, features and advantages of this invention will become readily apparent to persons skilled in the art after review of the following description, including the claims, and with reference to the drawings that are appended to and form a part of this specification.

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part whether or not such an axis is designated in the figures. An axial surface is therefore one that faces in the axial direction. In other words, an axial surface faces in a direction along the central axis and a radial surface faces generally laterally away from or toward the central axis. It will be understood, however, that in actual implementation, the directional references used herein may not necessarily correspond with the installation and orientation of the corresponding components or device.

Figure 1:
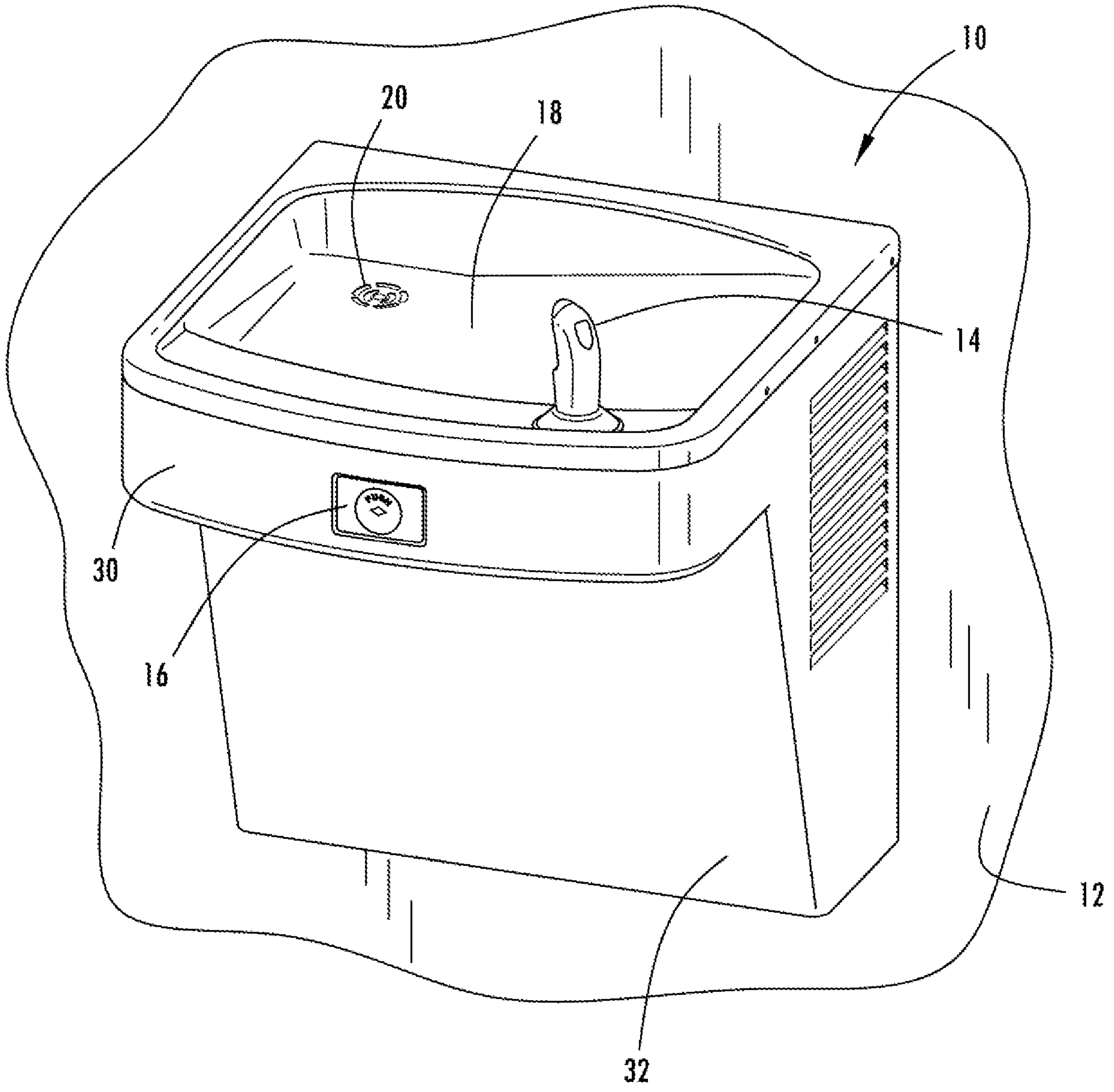
FIG. 1 is a perspective view of a wall-mounted drinking fountain.
Figure 2:
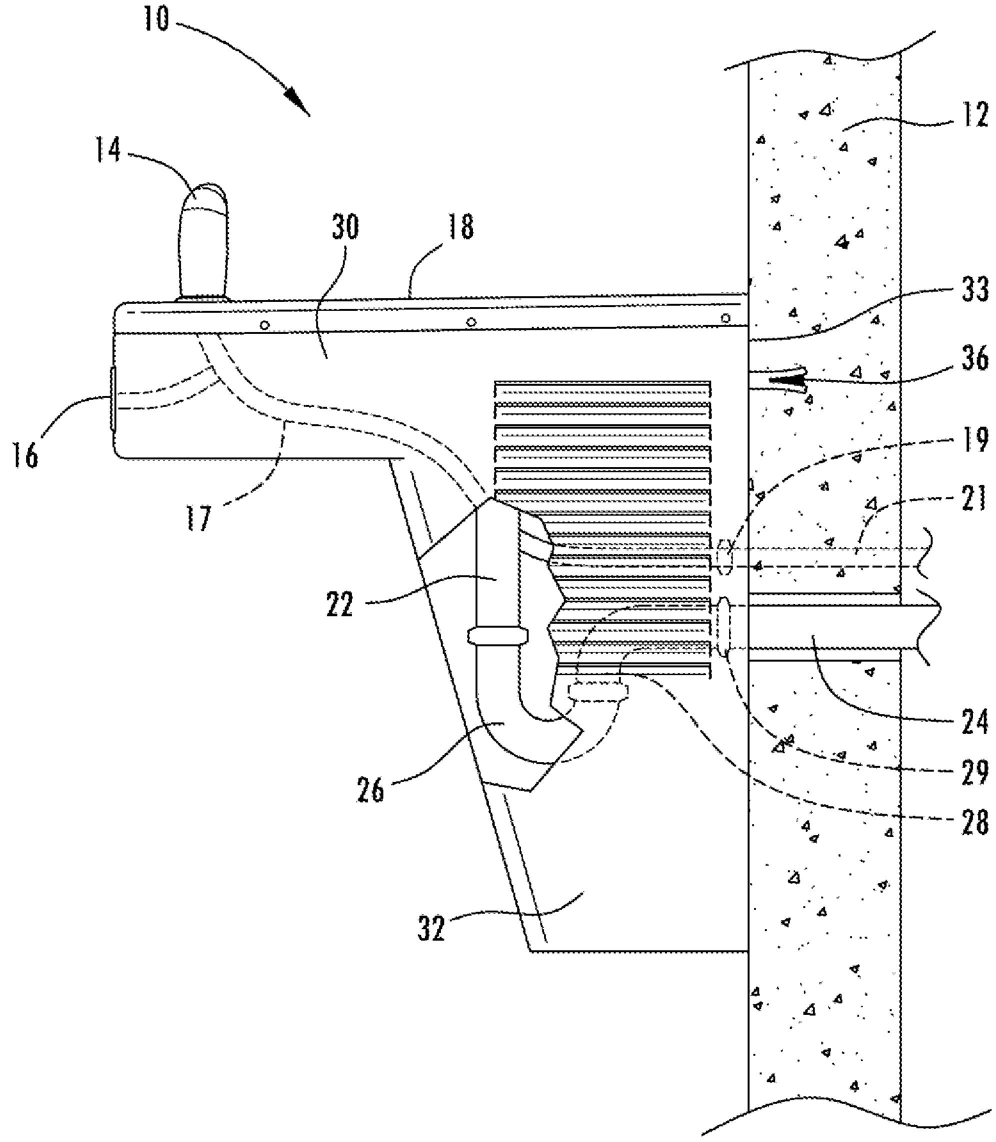
FIG. 2 is a side view of the drinking fountain seen in FIG. 1 mounted to a wall by a wall hanger bracket.

Referring now to the drawings, generally illustrated in FIGS. 1 and 2 is a drinking fountain 10 according to the prior art. The drinking fountain 10 includes a bubbler 14 that provides, on demand, water for drinking purposes. The on demand aspect of the drinking fountain 10 is implemented via a pushbutton and valve assembly 16 connected to a water supply line 17 that is in turn coupled via an inlet connector 19 to a potable water source 21, as generally depicted in FIG. 2. The nozzle of the bubbler 14 is directed so that water is provided in an upward direction, out and over a basin 18 that collects the dispensed water. Water received in the basin 18 is directed by the shape of the basin 18 to a drain opening 20, which is also provided in the basin 18. From the drain opening 20, water is collected in a tailpipe 22 (seen in FIG. 2) flows through a P-trap 26, elbow connector 28 and coupling 29 to a waste pipe 24 extending from the wall 12. From the waste pipe 24, water is directed to the wastewater drain system of the facility. Enclosing the plumbing components of the drinking fountain 10 are an apron 30 and cover 32.

As seen in FIG. 2, the drinking fountain 10 is mounted to the wall 12 and connected to the water supply 21 and waste pipe 24. To support the drinking fountain 10 on the wall 12, a wall hanger bracket 33 is secured to the wall 12 using fasteners 36. The fasteners 36 extend through apertures in the bracket 33 and into the wall 12. While the type of fastener 36 depends on the type of wall 12, concrete wall anchors 36 are shown. The rear side of the drinking fountain 10 is formed such that features of the rear panel or frame of the drinking fountain 10 engage with outwardly extending flanges of the wall hanger bracket 33 and hang the drinking fountain 10 thereon.

Drinking fountains of the above general type are found in many public locations where it may now prove desirable to have a water bottle filling station, as opposed to a drinking fountain. According to the present invention, such water fountains 10 may be converted or retrofitted from a drinking fountain 10 to a water bottle filling station 40 whose singular purpose is to fill personal water bottles with water in a hands-free manner.

Figure 3A:
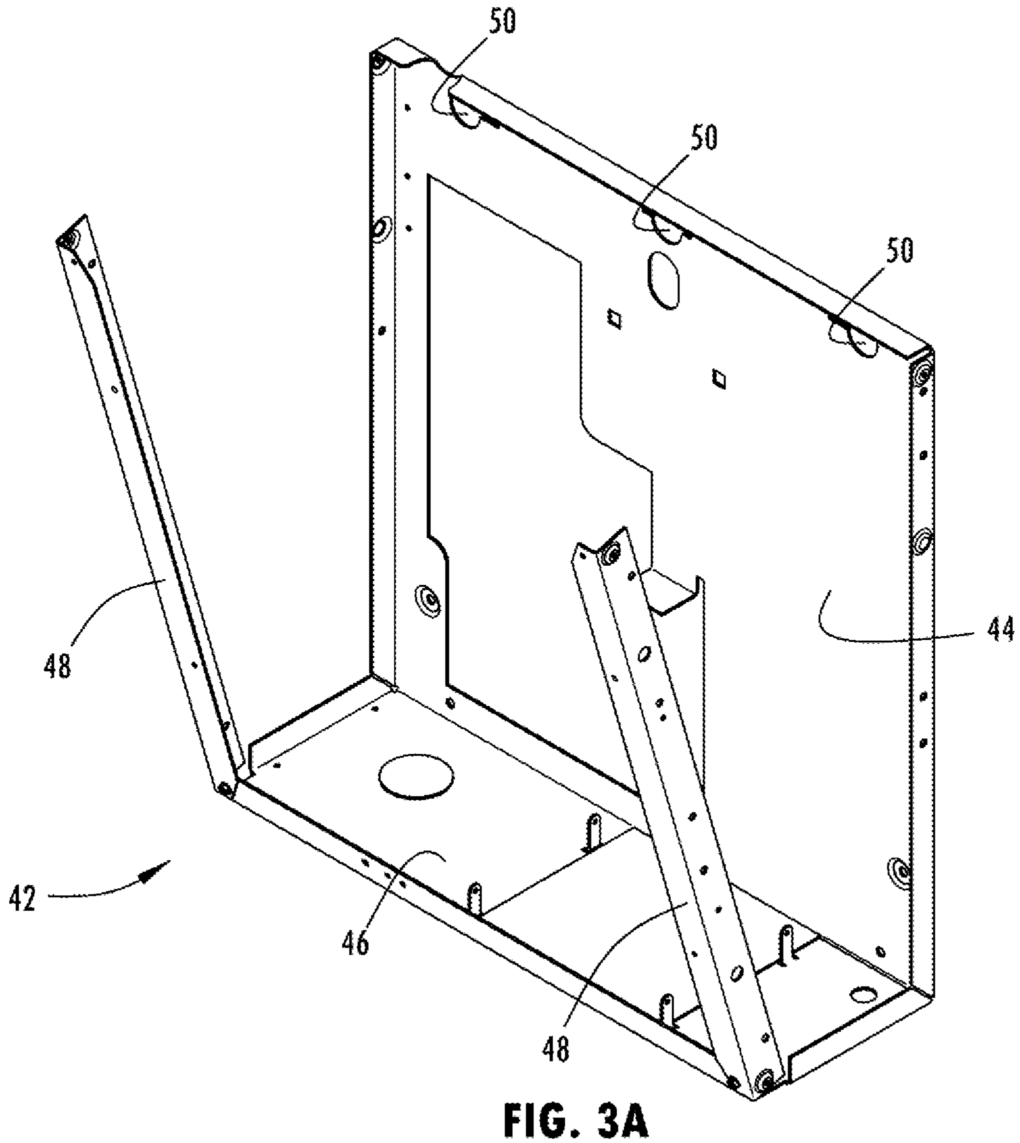
FIG. 3A is a perspective view of the frame of a bottle filling station embodying the principles of the present invention.
Figure 5:
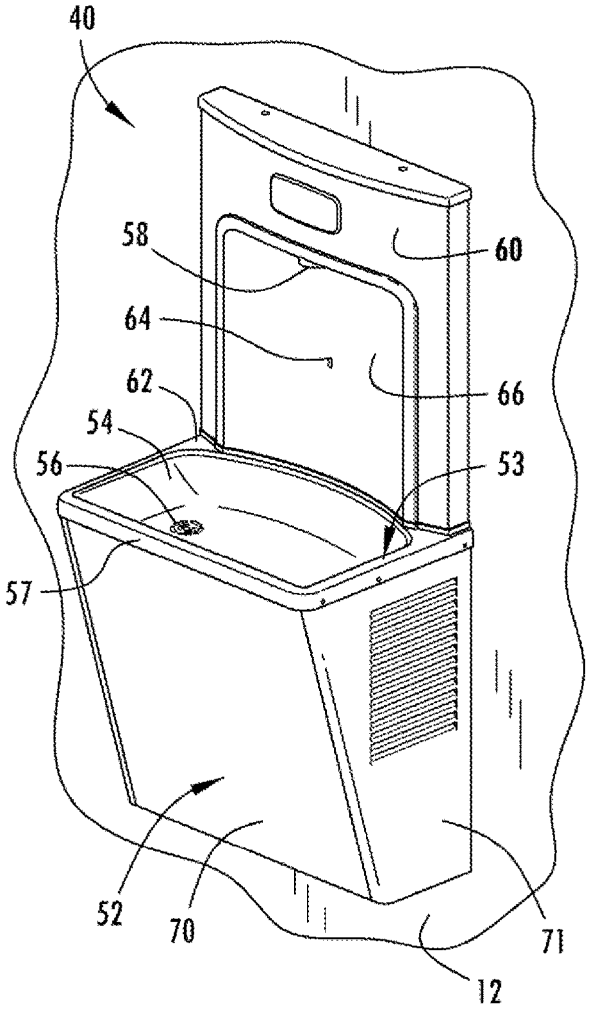
FIG. 5 is a right side perspective view of the bottle filling station of FIG. 4 mounted to the wall seen in FIG. 1 and replacing previously shown wall-mounted drinking fountain.
Figure 6:
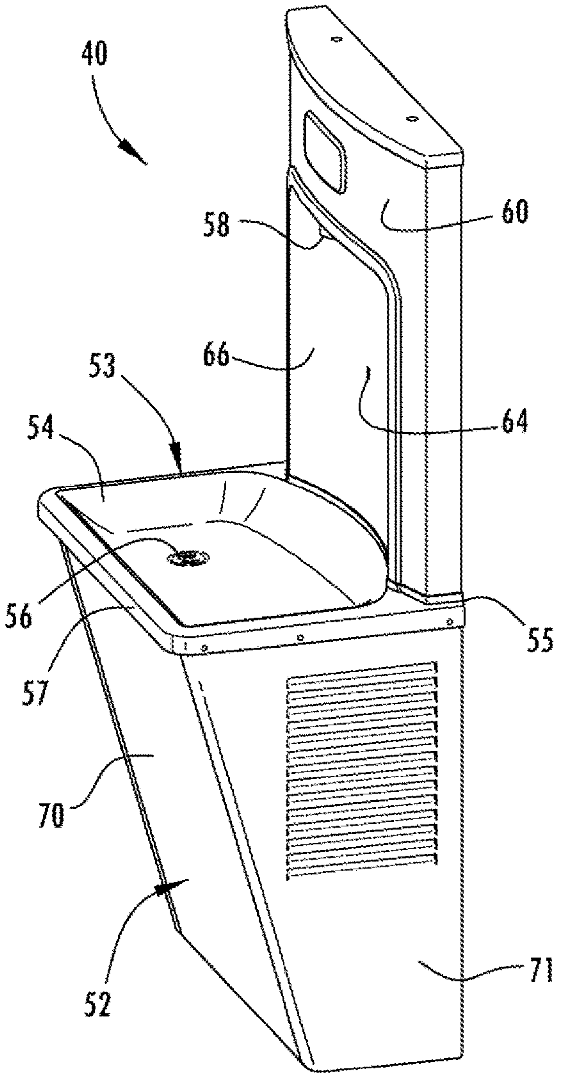
FIG. 6 is another right side perspective view showing the bottle filling station.
Figure 7:
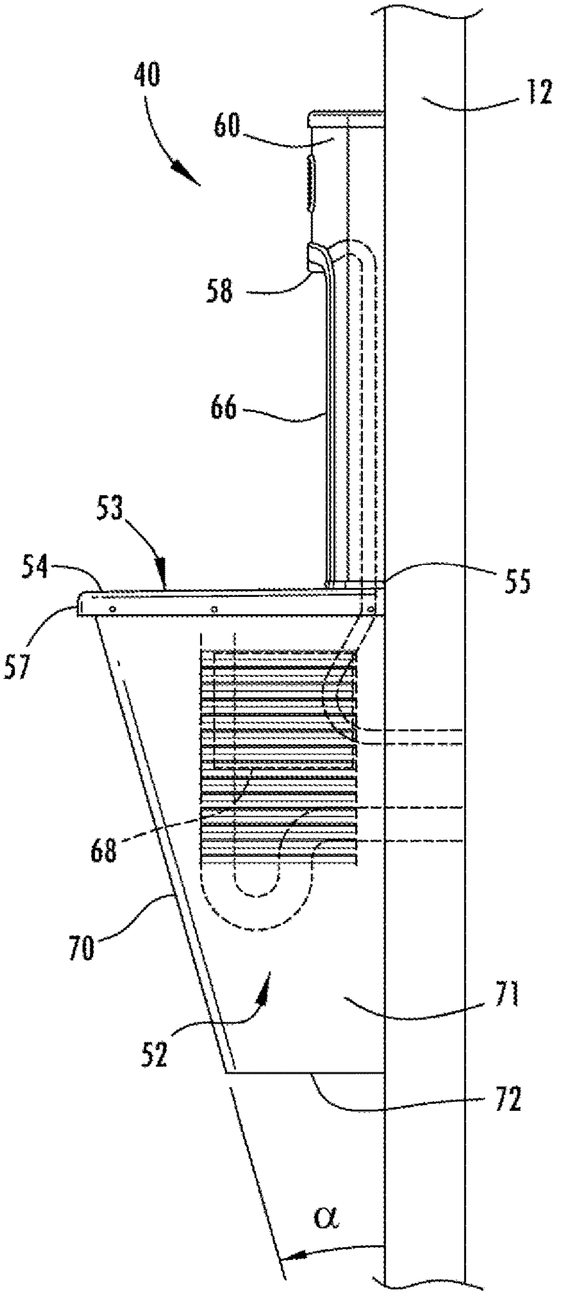
FIG. 7 is a side elevational view of the present bottle filling station.

As represented in FIGS. 3A, 5 and 7 and in accordance with the principles of the present invention, the water bottle filling station 40 may utilize the existing wall hanger bracket 33 of the drinking fountain 10 it is replacing to aid in the mounting of the water bottle filling station 40 to the wall 12 or, alternatively, the water bottle filling station 40 may use its own wall hanger bracket 34, but with the same fasteners 36 that secured the existing wall hanger bracket 33 to the wall 12. During retrofitting the drinking fountain 10 with the present water bottle filling station 40, the inlet connector 19 of the water supply line 17 is disconnected from the water supply 21, as is the tailpipe 22, P-trap, elbow connector 28 from the waste pipe 24. Thereafter, the drinking fountain 10 is disengaged from the wall hanger bracket 34 and removed.

After the drinking fountain 10 has been removed, the water bottle filling station 40 is installed in the same location utilizing the same fasteners 36, water supply 21 and waste pipe 24, without requiring relocating or modification of any of the fasteners 36, water supply 21 or waste pipe 24. As such, the present water bottle filling station does not require opening of the wall 12 to provide access for relocating of the water supply 21 or waste pipe 24, thereby eliminating various inherent issues in older buildings relating to hazardous materials and exposure to the same.

Figure 3B:
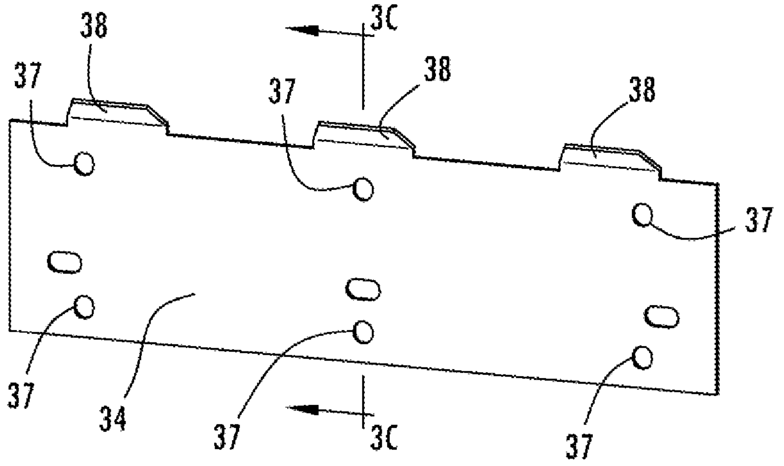
FIGS. 3B and 3C illustrate the wall hanger bracket utilized with the frame of the bottle filling station seen in FIG. 3A.
Figure 3C:
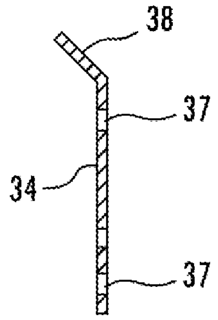
Figure 4:
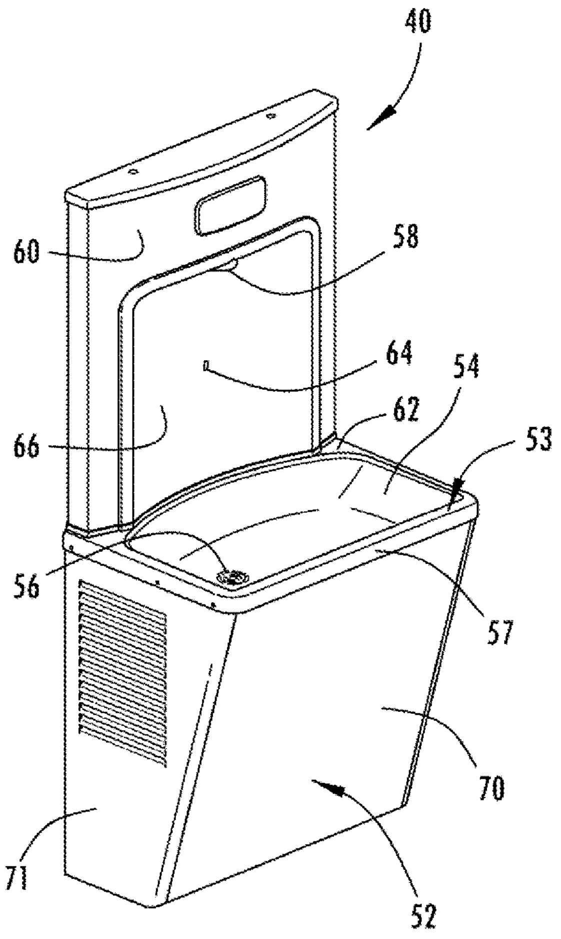
FIG. 4 is a left side perspective view of a bottle filling station embodying the principles of the present invention.

To support the water bottle filling station 40 on the wall 12, the wall hanger bracket 34, seen in FIGS. 3B and 3C, includes a central plate portion having apertures 37 that correspond to the spacing of the existing fasteners 36 and allow for reuse thereof. The wall hanger bracket 34, further includes flanges 38 that extend outwardly and upwardly from the central plate portion and from the wall 12 once the wall hanger bracket 34 is mounted thereon. The station 40 itself is provided with a frame 42 that includes a back plate 44, a bottom plate 46 and struts 48. The frame 42 is configured to engage the wall hanger bracket 34 and, as shown, includes apertures 50 provided in the back plate 44 and into which the flanges 38 of the wall hanger bracket 34 are received. With the frame 42 supported on the wall by the flanges 38 of the wall hanger bracket 34, a water supply line (not shown in FIG. 3A) may then be connected to the water source 21 and drain components (also not shown in FIG. 3A) connected to the waste pipe 24.

Provided on top of the frame 42 is a top 53, which is herein referred to as a basin 53. The basin 53 includes a recessed receptacle or bowl 54 that is provided with a drain opening 56 similarly connected via a tailpipe, P-trap and elbow connector (the drain components) to the existing waste line 24 extending from the wall 12. To enclose the plumbing components of the water bottle filling station 40, a cover 52 surrounds at least three sides of the frame 42 and includes a planar front cover 70 located between a pair of opposed side panels 71.

A nozzle 58 provides water on-demand for filling the user's personal water bottle. The nozzle 58 is provided in a backsplash 60 and coupled via the water supply line (also located in the backsplash and similar to water supply line 17 seen in FIG. 2) to the water source 21. During use of the water bottle filling station 40, water exiting the nozzle 42 is directed downward into a bottle located immediately below the nozzle 58 and toward the basin 53 and bowl 54. The backsplash 60 extends upward from a top surface 62 of the basin 53, adjacent to the wall 12 and a rear edge 55 of the basin 53 to protect the wall 12 from inadvertent splashing of water and to enable easy cleaning of the water bottle filling station 40, basin 53 and surrounding area.

The nozzle 58 is intended to be operated hands-free. To initiate the flow of water from the nozzle 58, a sensor 64 is provided in an alcove 66 defined in the front of the backsplash 60. The sensor 64 may be of a well know variety, such as a motion detector, proximity sensor or other sensor, and is coupled to a flow switch (not shown) provided in the supply line. Accordingly, the sensor 64 will cause water to be provided from the nozzle 58 whenever a bottle or other object is detected in proximity to the sensor 64. Conversely, the sensor 64 prevents and stops the flow of water from the nozzle when a bottle is no longer detected near the sensor 64.

Alternatively, the nozzle 58 may be operated by means other than the proximity sensor 64. Such means may include a foot pedal, hand operated button/bar or another mechanical or pneumatic actuation mechanism.

Figure 8:
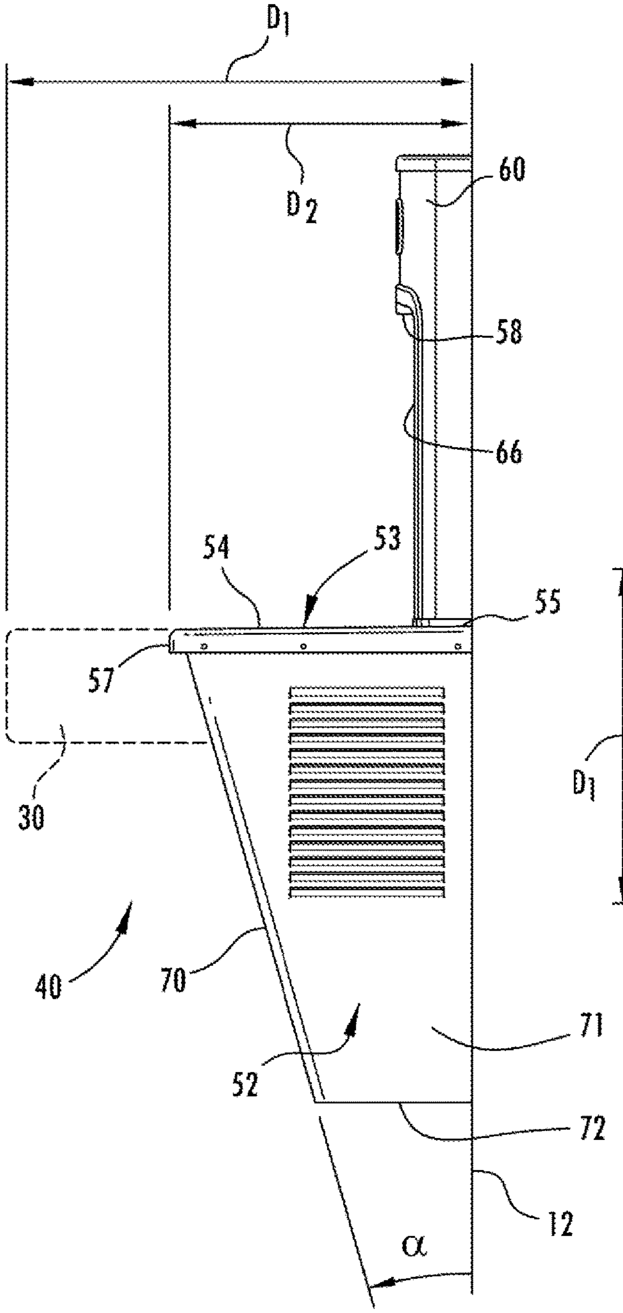
FIG. 8 is a side elevational view of the present bottle filling station and illustrating the compact construction thereof in comparison to the drinking fountain of FIG. 1, which is shown in phantom.
Figure 9:
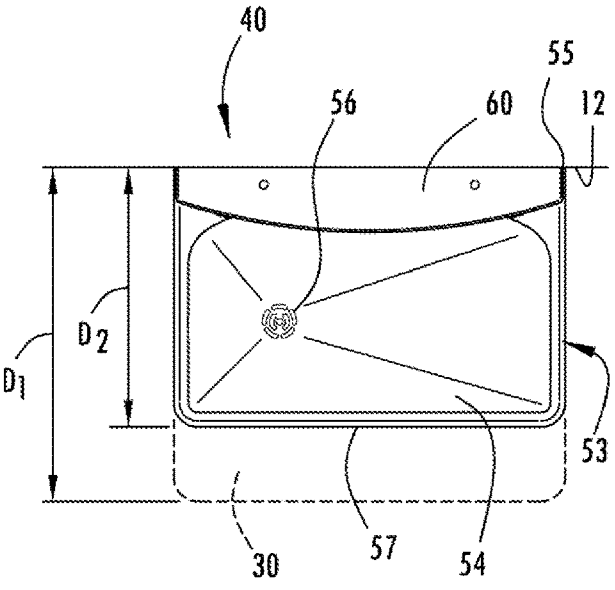
FIG. 9 is a top plan view of the present bottle filling station and illustrating the compact construction thereof in comparison to the drinking fountain of FIG. 1, which is shown in phantom.

Without a bubbler 14, was well as its associated actuation mechanism and water lines in the front region of the station, the present water bottle filling station 40 is made more compact and extends a shorter distance from the wall than a drinking fountain, such as that seen in FIG. 1 This difference is seen in FIGS. 8 and 9 where a conventional drinking fountain, like that seen in FIG. 1, is illustrated in phantom relative to the present water bottle filling station 40. As shown, the apron 30 of the traditional drinking fountain 10 extends from the wall 12 a distance D1. This distance, D1, is substantially greater than the distance D2 that the front lip or of the basin 53 is located from the wall 12 in the present water bottle filling station 40. In some implementations, this distance D2 may be 3½ to 7 inches (or more) less than D1. As such, the water bottle filling station 40 only extends a distance D2 of between 4 to 13 inches from the wall 12. Preferably, however, the distance D2 ranges from 11 to 12 inches.

By reducing this lateral distance D2 from the rear edge 55/wall 12 to the front lip 57, the compact construction of the present water bottle filling station 40 allows the nozzle 58 to be more readily and easily accessed by individual having a smaller physical stature, including smaller children in school settings. With a larger lateral distance, such as the D1 distance of the traditional drinking fountain, smaller stature individuals may feel compelled to reach or may physically only be able to reach the nozzle from a lateral side of station 40. A person on the lateral side of the station 40 might therefore compromise or violate the desired social distancing from an adjacent station 40.

Additionally, by providing the water bottle filling station 40 with the lateral depth D2 noted above, approximately 11 to 12 inches, the water bottle filling station 40 may be internally provided with a chiller 68, designated phantom in FIG. 7, allowing the water bottle filling station 40 to provide chilled water via the nozzle 58. This is significant in a retrofit application since the wall 12 does not need to be opened up to provide a space within the wall 12 to accommodate a chiller, thereby increasing installation costs and potential exposure to hazardous materials in older buildings, as mentioned above. With the present water bottle filling station 40, the chiller 68 may be optional and provided where needed, for example in the southwestern states of Arizona and Nevada, but not provided in states having cold tap water supplies, such as Michigan and Wisconsin. Accordingly, water bottle filling stations 40 with a lateral depth D2 less than 11 inches and down to 4 inches may be desirable in locations not requiring the implementation of a chiller 68.

To achieve this reduced depth of D2, as seen in FIGS. 7 and 8, the cover 52 of the water bottle filling station 40 includes a front panel 70 that extends from a base 72, at a constant angle α, up to and under the basin 53 at the front lip 57 or immediately inside or adjacent thereto. The angle α, measured from the back plate 44 (the rear side of the water bottle filling station 40) or surface of the wall 12 outward to the front lip 57 of the top 53 adjacent to the upper end of the front panel 70, is preferably in the range of 6° to 19°, more preferably in the range of 15° to 19° and most preferably in the range 16° to 18°. The angle may be more or less that that stated above, but the above angles provide for the requisite lateral distance D2 while maintaining a generally traditional look to the water bottle filling station 40, as seen in FIGS. 4-9.

The above description is meant to be illustrative of at least one preferred implementation incorporating the principles of the invention. One skilled in the art will really appreciate that the invention is susceptible to modification, variation and change without departing from the true spirit and fair scope of the invention, as defined in the claims that follow. The terminology used herein is therefore intended to be understood in the nature of words of description and not words of limitation.

We claim:

1. A compact water bottle filling station for surface mounting to a wall, the water bottle filling station comprising:

a frame having a back plate configured to be in surface-to-surface contact with a front surface of the wall and configured to be supported on the wall by a wall hanger bracket secured to the front surface of the wall;

a basin provided and supported on top of the frame and having a recessed receptacle including a drain opening, the basin including a front lip and a rear edge, and defining a lateral distance defined from the rear edge to the front lip;

a cover located beneath the basin and surrounding at least three sides of the frame, the cover including a pair of opposed side panels and a front panel located between the side panels, the front panel extending upwardly from a base of the compact bottle filling station and terminating underneath the basin at a location positioned between the recessed receptacle and the front lip, a backsplash extending upward from the rear edge and configured to be in surface-to-surface contact with the front surface of the wall; and a singular water dispensing device provided on the compact water bottle filling station, the singular water dispensing device including a nozzle provided in the backsplash and configured to direct water downward from the nozzle into the basin.

2. A compact water bottle filling station for surface mounting to a wall, the water bottle filling station comprising:

a frame having a back plate configured to be in surface-to-surface contact with a front surface of the wall and configured to be supported on the wall by a wall hanger bracket secured to the front surface of the wall;

a basin provided and supported on top of the frame and having a recessed receptacle including a drain opening, the basin including a front lip and a rear edge, and a lateral distance defined from the rear edge to the front lip;

a cover located beneath the basin and surrounding at least three sides of the frame, the cover including a pair of opposed side panels and a front panel located between the side panels, the front panel extending upwardly from a base of the compact bottle filling station and terminating underneath the basin immediately behind the front lip of the basin and immediately adjacent to a maximum lateral extent of the compact water bottle filling station;

a backsplash extending upward from the rear edge and configured to be in surface-to-surface contact with the front surface of the wall; and a singular water dispensing device provided on the compact water bottle filling station, the singular water dispensing device including a nozzle provided in the backsplash and configured to direct water downward from the nozzle into the basin.

3. The compact water bottle filling station according to claim 2, wherein the lateral distance is greater than 4 inches and less than 13 inches.

4. The compact water bottle filling station according to claim 2, wherein the lateral distance is in the range of 11 to 12 inches.

5. The compact water bottle filling station according to claim 2, wherein the lateral distance is at least 6.5 inches less than a corresponding lateral distance of a wall mountable drinking fountain having a bubbler.

6. The compact water bottle filling station according to claim 2, further comprising a rear side, and wherein the front panel is planar and extends up to the basin at an oblique angle relative to the rear side of the compact water bottle filling.

7. The compact water bottle filling station according to claim 6, wherein the front panel extends at an angle in the range of 6° to 19°.

8. The compact water bottle filling station according to claim 6, wherein the front panel extends at an angle in the range of 15° to 19°.

9. The compact water bottle filling station according to claim 6, wherein the front panel extends at an angle in the range of 16° to 18°.

10. The compact water bottle filling station according to claim 6, further comprising a chiller positioned within the frame.

11. In combination a water bottle filling station for retrofitting a drinking fountain surface-mounted to a wall into a surface-mounted water bottle filling station and employing a wall hanger bracket of the drinking fountain mounted to the wall, the water bottle filling station comprising:

a frame supported on the wall by a wall hanger bracket of the drinking fountain secured to the wall, the frame having a backplate in surface-to-surface contact with a front surface of the wall;

a basin provided and supported on top of the frame and having a recessed receptacle including a drain opening, the basin including a front lip and a rear edge, the front lip and rear edge defining a lateral distance therebetween extending perpendicularly from the wall;

a cover located beneath the basin and surrounding at least three sides of the frame, the cover including a pair of opposed side panels and a front panel located between the side panels, the front panel extending upwardly from a base of the compact bottle filling station and terminating underneath a portion of the basin and forward of the recessed receptacle;

a backsplash extending upward from the rear edge in surface-to-surface contact with the from surface of the wall; and a singular water dispensing device provided on the compact water bottle filling station, the singular water dispensing device including a nozzle provided in the backsplash and configured to direct water downward from the nozzle into the basin.

12. The combination according to claim 11, further comprising the nozzle being coupled to an existing water supply line extending from the wall.

13. The combination according to claim 11, further comprising the drain opening being coupled to an existing waste pipe extending from the wall.

14. The combination according to claim 11, wherein the lateral distance is in the range of 4 to 13 inches.

15. The combination according to claim 11, wherein the front panel is planar and extends up to the basin at an oblique angle relative to a rear side of the compact water bottle filling.

16. The combination according to claim 15, wherein the angle is in the range of 15° to 19°.

* * * * *